(No Model.)

C. E. MERRIFIELD
SPOKE SOCKET.

No. 272,571. Patented Feb. 20, 1883.

WITNESSES:
Gott. Koehler
Frank West

INVENTOR:
Charles E. Merrifield
Per
James B. Lizius & Co.
Attorneys.

UNITED STATES PATENT OFFICE.

CHARLES E. MERRIFIELD, OF INDIANAPOLIS, INDIANA.

SPOKE-SOCKET.

SPECIFICATION forming part of Letters Patent No. 272,571, dated February 20, 1883.

Application filed December 6, 1882. (No model.)

*To all whom it may concern:*

Be it known that I, CHARLES E. MERRIFIELD, a citizen of the United States, residing at Indianapolis, in the county of Marion and State of Indiana, have invented certain new and useful Improvements in Spoke-Sockets, of which the following is a specification.

My invention relates to a new method of connecting the spokes and fellies of vehicle-wheels; and the objects of my invention are, first, to provide in new wheels a fastening to connect the tongue of the spoke to the felly of the wheel without tenoning the spoke and mortising the felly; second, to provide a connection between spoke and felly which prevents the spoke from wearing out at outer end, and which prevents the felly from wearing out or splitting at the point of contact with spoke; third, to provide the means of tightening either loose spokes or fellies without removing the spokes from the hub. I attain these objects by the device illustrated in the accompanying drawings, in which—

Figure 1:
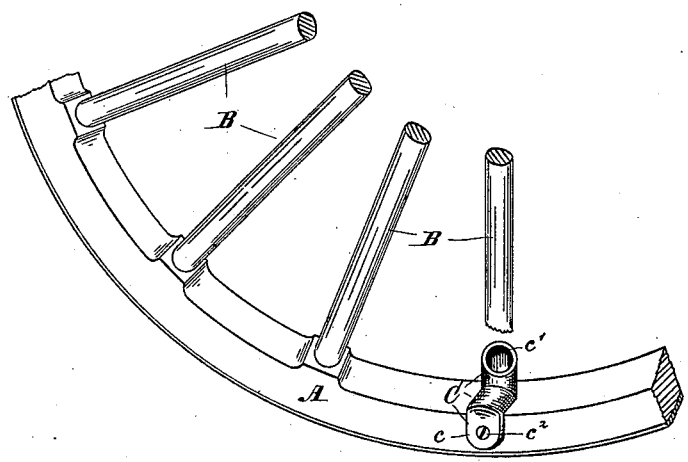
Figure 2:
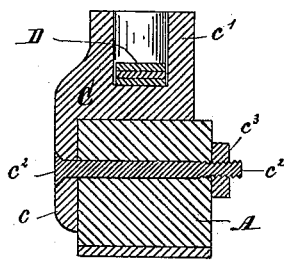

Figure 1 is a view showing a part of the felly and spokes of a vehicle-wheel, also one of my improved spoke-fasteners. Fig. 2 is a vertical section through the felly and my improved spoke-fastener.

Similar letters refer to similar parts throughout both views.

A is the felly of a wheel. B is the spoke. C is a cast-metal shoulder with flange $c$, socket $c'$, rivet or bolt $c^2$, and washers D. To the felly A is secured spoke-fastener C by rivet or bolt $c^2$ through flange $c$ and felly A, the end of spoke having been previously inserted into socket $c'$ of fastener C.

To repair a wheel after one or more of the spokes have become loose, first cut off the tongue of spoke to the desired length, then pass socket $c'$ onto end of spoke, and crowd spoke back into place, with flange $c$ resting against felly A. After boring a hole through felly insert rivet or bolt $c^2$ and screw on nut $c^3$, and the wheel is as strong as ever without having taken the foot of spoke from hub. This method of inserting the ends of spokes into a metal socket prevents the spokes from wearing out at outer ends, while the metal shoulder, by giving spoke an increased bearing on felly, prevents the felly from wearing out, and the rivet which fastens shoulder to felly prevents the felly from splitting at the point of contact with spoke.

Should any of the spokes or the felly shrink and rattle or become loose in my improved fastener, remove rivet or bolt $c^2$, then take fastener C from tongue of spoke B, insert into socket $c'$ one or more of washers D, replace spoke B, then crowd the spoke and fastener into place, and secure them by rivet or bolt $c^2$.

What I claim as my invention, and desire to secure by Letters Patent, is—

1. The combination, in a wheel for vehicles, of the spoke B, fastener C, and felly A, as described and specified.

2. The combination, in a spoke-fastener, of flange $c$, socket $c'$, and rivet or bolt $c^2$, substantially as described, and for the purpose specified.

In testimony whereof I have signed my name to this specification in the presence of two subscribing witnesses.

CHARLES E. MERRIFIELD.

Witnesses:
GOTTF. KOEHLER,
FRANK WEST.